(12) United States Patent
Nieraad et al.

(10) Patent No.: US 11,033,130 B2
(45) Date of Patent: Jun. 15, 2021

(54) METHOD FOR CONNECTING AN ITEM OF DISHWARE TO AN INFORMATION CARRIER, AND APPARATUS COMPRISING AN ITEM OF DISHWARE AND AN INFORMATION CARRIER

(71) Applicant: Rastal GmbH & Co. KG, Höhr-Grenzhausen (DE)

(72) Inventors: Thomas Nieraad, Hofheim (DE); Carsten Kehrein, Koblenz (DE); Dietrich Busch, Bad Ems (DE); Michael Lammel, Aachen (DE); Benjamin Lederhofer, Langenfeld (DE)

(73) Assignee: RASTAL GMBH & CO. KG, Höhr-Grenzhausen (DE)

( * ) Notice: Subject to any disclaimer, the term of this patent is extended or adjusted under 35 U.S.C. 154(b) by 0 days.

(21) Appl. No.: 16/465,845

(22) PCT Filed: Dec. 4, 2017

(86) PCT No.: PCT/EP2017/081399
§ 371 (c)(1),
(2) Date: May 31, 2019

(87) PCT Pub. No.: WO2018/104241
PCT Pub. Date: Jun. 14, 2018

(65) Prior Publication Data
US 2019/0290035 A1  Sep. 26, 2019

(30) Foreign Application Priority Data
Dec. 6, 2016  (DE) .......... 102016123593.8

(51) Int. Cl.
*A47G 19/02*  (2006.01)
*G06K 19/06*  (2006.01)
*G06K 19/08*  (2006.01)
(Continued)

(52) U.S. Cl.
CPC ....... *A47G 19/025* (2013.01); *A47G 19/2227* (2013.01); *G06K 19/06009* (2013.01);
(Continued)

(58) Field of Classification Search
CPC .......................... A47G 16/025; A47G 19/2227
See application file for complete search history.

(56) References Cited

U.S. PATENT DOCUMENTS 4,390,565 A * 6/1983 Fonda ................. C03C 8/16
427/226
5,343,804 A * 9/1994 Karlyn ............... B41F 15/0872
101/123
(Continued)

FOREIGN PATENT DOCUMENTS

DE  102005038004  2/2007
DE  202013100560  3/2013
(Continued)

*Primary Examiner* — Gary C Hoge
(74) *Attorney, Agent, or Firm* — Holzer Patel Drennan (57) ABSTRACT

The present invention concerns a method of connecting an item of dishware (1) to a contactlessly readable electronic information carrier (2) comprising the steps: providing the item of dishware (1), wherein the item of dishware (1) comprises a material selected from a group consisting of glass, ceramic and plastic or a combination thereof, and attaching the information carrier to the item of dishware. Contactlessly readable electronic information carriers applied to a self-adhesive carrier film are known. They can also be adhesively bonded to an item of dishware for identification thereof. In comparison according to the invention the above-mentioned method is further developed in that it further includes the steps: applying a cover layer of printing ink in such a way that the cover layer at least portion-wise covers a surface of the information carrier and (Continued)

the cover layer extends over a portion, which is not covered by the information carrier, on the surface of the item of dishware.

15 Claims, 4 Drawing Sheets

(51) Int. Cl.
    *G06K 19/077*      (2006.01)
    *G06K 19/07*      (2006.01)
    *A47G 19/22*      (2006.01)

(52) U.S. Cl.
    CPC ... *G06K 19/0723* (2013.01); *G06K 19/07758* (2013.01); *G06K 19/083* (2013.01)

(56) References Cited

U.S. PATENT DOCUMENTS

| | | | | |
|---|---|---|---|---|
| 2005/0087255 A1* | 4/2005 | Humphrey | ........... | A47G 21/182 141/94 |
| 2007/0145150 A1* | 6/2007 | Barczyk | ............. | G06K 19/0776 235/492 |
| 2007/0158293 A1* | 7/2007 | Andreani | ........... | G08B 13/2402 215/12.1 |
| 2008/0206510 A1* | 8/2008 | Huang | ................ | B29C 45/1671 428/76 |
| 2008/0270324 A1* | 10/2008 | Allard | ................ | G06Q 30/0283 705/400 |
| 2010/0052215 A1 | 3/2010 | Emond et al. | | |
| 2015/0062263 A1* | 3/2015 | Karasawa | ............ | B41J 2/17533 347/86 |
| 2017/0098148 A1* | 4/2017 | Schmidt | ........... | G06K 19/07758 |

FOREIGN PATENT DOCUMENTS

| | | | |
|---|---|---|---|
| DE | 102015109774 | 12/2016 | |
| GB | 2379739 | 3/2003 | |
| GB | 2379739 A * | 3/2003 | ............. B01L 3/545 |
| JP | 2005200079 A * | 7/2005 | |

* cited by examiner

METHOD FOR CONNECTING AN ITEM OF DISHWARE TO AN INFORMATION CARRIER, AND APPARATUS COMPRISING AN ITEM OF DISHWARE AND AN INFORMATION CARRIER

BACKGROUND

1. Field of the Invention

The present invention concerns a method of connecting an item of dishware to a contactlessly readable electronic information carrier comprising the steps: providing the item of dishware, wherein the item of dishware is composed of a material selected from a group consisting of glass, ceramic and plastic or a combination thereof, and attaching the information carrier to the item of dishware.

In addition the present application concerns an arrangement comprising an item of dishware consisting of a material selected from the group consisting of glass, ceramic and plastic or a combination thereof, and a contactlessly readable electronic information carrier attached to the item of dishware.

2. Relevant Background

Contactlessly readable electronic information carriers, in particular in the form of RFID transponders, which are applied to a self-adhesive carrier film, are known from the state of the art. They can also be adhesively bonded to an item of dishware for identification thereof.

It will be noted however that such a solution does not have either the dishwasher resistance that is frequently desired nor effective protection from manipulation. In addition that state of the art does not satisfy the aesthetic demands on glasses for serving branded drinks.

SUMMARY

In comparison the object of the present invention is to provide a method of connecting an item of dishware to a contactlessly readable electronic information carrier and an arrangement comprising an item of dishware and an information carrier fixed thereto, which make it possible to comply with at least one of the above-mentioned criteria.

At least one of the above-specified objects is attained by a method of connecting an item of dishware to a contactlessly readable electronic information carrier comprising the steps: providing the item of dishware, wherein the item of dishware is composed of a material selected from a group consisting of glass, ceramic and plastic or a combination thereof, and attaching the contactlessly readable information carrier to the item of dishware, and applying a cover layer of printing ink in such a way that the cover layer at least portion-wise covers a surface of the information carrier and the cover layer extends over a portion, which is not covered by the information carrier, of the surface of the item of dishware.

The cover layer according to the invention comprising printing ink which extends both over the surface of the information carrier itself and also over a surface of the item of dishware, that is not covered by the information carrier, provides for permanent sealing of the information carrier on the item of dishware. Depending on the choice of the printing ink the cover layer not only prevents detachment of or damage to the information carrier during the period of use of the item of dishware, but also ensures the required dishwasher resistance.

The term item of dishware is used to denote an article of daily use which is used when eating meals. In particular in accordance with the invention the general term item of dishware covers plates, bowls, dishes and drinking vessels.

The term drinking vessel in accordance with the present invention is used to denote a drinking vessel irrespective of the choice of its material. Preferably however a drinking vessel is made of glass. Drinking vessels in accordance with the present application include beakers, articles with handles like beer mugs, cups and pitchers, style vessels, but also bottles and drinking bottles.

In an embodiment a contactlessly readable electronic information carrier in accordance with the present invention includes a carrier substrate, in particular a carrier substrate of plastic. In addition in an embodiment the information carrier includes an electronic circuitry having a transmitting circuit for emitting a signal, a processing circuit and a permanent memory. Such electronic circuits are known in many different forms from the state of the art.

In that respect individual parts of the electronic circuitry can be integrated into an integrated circuit, namely a chip. A signal in accordance with the present invention can be an electrical, magnetic, electromagnetic or optical signal. Preferred embodiments however are those in which the signal is modulated on to a magnetic field or an electromagnetic field.

In an embodiment of the invention the electronic circuitry of the information carrier, in addition to the circuit, also includes a receiver circuit for receiving a signal. It will be appreciated that that receiver circuit is then connected to the processing circuit.

In an embodiment of the invention the transmitter and/or receiver circuit are analog circuits. In a further embodiment the processing circuit is a digital circuit. In an embodiment such a digital processing circuit is a microcontroller.

In a further embodiment the circuitry also has an antenna connected to the transmitter and/or receiver circuit. That serves to emit or receive the signal in the form of a magnetic field or an electromagnetic field.

In an embodiment of the invention the electronic circuitry is an RFID transponder. Coupling between the reading device and such an RFID transponder is effected in an embodiment of the invention either by means of a short-range alternating magnetic field or by high-frequency radio waves.

In an embodiment of the invention the RFID transponder is a transponder in accordance with the NFC standard. Such transponders can be read with conventional mobile terminal devices, for example a smartphone or a tablet, and are inexpensively available.

Attachment of the information carrier to the item of dishware can be effected either directly on a surface of the item of dishware or indirectly on a layer applied to the surface of the item of dishware, in particular a layer of printing ink.

In that respect the term attachment is to be interpreted broadly as the actual connection to the item of dishware is implemented by the cover layer of printing ink. In particular in an embodiment the information carrier can merely be laid thereon. In an embodiment the information carrier is adhesively bonded. In a further embodiment elements of the information carrier are printed on to the item of dishware or on to a layer of printing ink on the item of dishware and/or an integrated circuit is provided on the item of dishware or a layer of printing ink. In such an embodiment the material of the item of dishware or the printing ink of a layer applied to the item of dishware itself forms the substrate of the information carrier.

In an embodiment of the invention application of the cover layer of printing ink includes application of the cover layer by printing and/or transfer of the cover layer in the form of a printed transfer image.

If transfer of the cover layer in the form of a printed transfer image is selected for applying the cover layer of printing ink, then in an embodiment firstly a decoration of the desired size is applied by printing to a carrier paper. Then the finished printed cover layer is applied manually in the manner of an adhesive layer or decal to the item of dishware and at least portion-wise over the information carrier. Finally the applied transfer image is hardened by the application of heat (tempering).

In an embodiment of the invention the transfer image is printed with an organic ink system.

In comparison, the term applying the printing layer by printing is used to denote direct printing on the item of dishware, on the information carrier or on any other material layer on the item of dishware. In that printing operation the printing ink is respectively delivered by a printing apparatus, in particular a Dur machine like a screen printing machine, on to the respective surface of the item of dishware, the information carrier or any other material layer on the item of dishware.

In the case of direct overprinting of the information carrier with the cover layer of printing ink there are many different challenges which are to be overcome by means of the present invention.

It has proven to be problematic that, in almost all embodiments of the present invention, at least two different materials, namely a material of the information carrier and a material of the item of dishware or a material to be applied to or printed on the item of dishware, are to be overprinted.

On the other hand the information carrier in embodiments does not have flat surfaces, but rather there is at least one portion of the information carrier, which projects with respect to one of the surfaces of the information carrier.

In particular such a projecting portion is present in embodiments of the information carrier, in which the antenna is printed on to a flat/flat substrate and an integrated circuit is applied to the substrate, including the electronic circuitry. That integrated circuit then projects as a portion in relation to the surface. In order to produce an attractive overall aesthetic impression the printing ink must mask or cover the edges which occur due to the projection of a portion in relation to the otherwise flat surface.

For that purpose in an embodiment of the invention the cover layer completely covers the surface of the information carrier and the printing ink of the cover layer is printed on to the surface of the information carrier with a thickness of at least 100 µm, preferably a thickness of at least 200 µm and particularly preferably a thickness of at least 250 µm. With a cover layer of such a thickness it is possible to level out the edges with respect to the surface of the projecting portions of the information carrier and to apply the coating with the printing ink in such a way that a substantially homogeneous and flat surface is generated on the cover layer.

For that purpose in an embodiment the viscosity of the printing ink has to be so selected that on the one hand it runs sufficiently after the printing operation in order to provide for the required leveling of the edges, but on the other hand the viscosity must be such that the printing ink does not run off from the printed surface.

To meet both conditions in an embodiment of the invention the printing ink is of high viscosity.

In a further embodiment the printing ink is fast-drying. In that respect the term fast-drying printing ink in accordance with the present invention is used to mean that the ink is dust-dry within fewer than 30 minutes, preferably within fewer than 10 minutes and particularly preferably within less than one minute when setting the appropriate drying parameters and allows direct further processing, in particular covering over with a further layer of printing ink.

Irrespective of its manufacture however the cover layer serves not only for aesthetics coverage of the information carrier, but also provides for encapsulation of the information carrier and thus affords protection from external effects like for example cold or hot rinsing water on the information carrier. Coverage of the information carrier with printing ink also protects its from thermal influences by virtue of the insulating properties of the printing ink.

In an embodiment of the invention the information carrier has a first and a second surface, wherein a portion of the information carrier, for example an integrated circuit, projects with respect to the first surface, wherein the information carrier is attached to the item of dishware in such a way that the cover layer is in engagement with the first surface and the portion of the information carrier, that projects with respect to the first surface.

In a further embodiment of the invention there is provided an item of dishware having a receiving portion for the information carrier in the form of a depression or groove in a surface of the item of dishware. Such an embodiment is desirable as it makes it possible to arrange for a surface of the information carrier to be on the same level as the surface of the item of dishware. In such an embodiment the printing ink of the cover layer has to compensate only for unevenness and edges on the surface of the information carrier, but not the thickness of the substrate of the information carrier itself.

In a further embodiment the receiving portion is in the form of a groove or depression in such a way that it receives a portion of the information carrier, that projects with respect to the first surface. If it is assumed that, in an embodiment, the information carrier substantially comprises a flat substrate, but the actual chip projects in relation thereto on the first surface, then in such an embodiment the information carrier can be received with its first surface on the item of dishware so that the projecting portion of the information carrier extends into the groove. In that way then the second surface which is substantially flat is covered over with the cover layer.

In principle it is initially immaterial for the method according to the invention, at what position on the item of dishware the information carrier and the cover layer are provided. It has been found however that there are positions on the surface of an item of dishware, which are particularly suitable for receiving at least the information carrier and the cover layer.

If in an embodiment of the invention the item of dishware is a drinking vessel, in particular a drinking glass, or a bottle, it may be desirable if at least the information carrier and the cover layer are arranged in the region of the surface of the item of dishware on which it stands or in the region of the bottom of the item of dishware. As for example glasses or also bottles are repeatedly always set down on their base surface it is possible in that way for the information carrier to be at a defined spacing from a reading device. In that respect such a reading device is for example let into a table surface.

In the case of drinking vessels or bottles having a concavely curved surface on which they stand or having a concavely curved bottom the cavity formed by the curvature can accommodate the structure comprising at least the information carrier and the cover layer, wherein the drinking vessel can still be set down as before without tilting on a line extending around the structure or a plurality of points around the structure.

In an alternative embodiment a standing ring or a plurality of standing points which extend around the structure are applied in addition to the structure comprising at least the information carrier and the cover layer on the surface of the drinking vessel on which it stands. In that respect it will be appreciated that the standing ring or points project with respect to the surface of the cover layer in order to permit secure, firm, preferably tipping-free, support for the item of dishware.

As described hereinbefore the application of the standing ring or the standing points includes directly printing those elements on the item of dishware or a layer connected to the item of dishware and/or transfer of the standing ring or points in the form of at least one printed transfer image.

In a further embodiment of the invention the method according to the invention has the step of applying a carrier layer of printing ink to a surface of the item of dishware, wherein the information carrier is then attached to the carrier layer. In that way it is possible to form a structure in which the information carrier is completely surrounded by printing ink, that is to say enclosed by the printing ink. The carrier layer of printing ink however also serves to conceal the information carrier upon being fixed to a transparent item of dishware, for example a drinking vessel of glass, for a viewing person, who looks through the portion of the item of dishware, on which the electronic information carrier is attached. Application of the carrier layer of printing ink again selectively includes application by printing and/or transfer of the carrier layer in the form of a printed transfer image.

It will be appreciated that in such an embodiment of the invention the operation of applying the carrier layer is effected prior to attachment of the information carrier and the information carrier is attached to the carrier layer and is thus not directly in engagement with the item of dishware.

In an embodiment of the invention the carrier layer and the cover layer are applied in such a way that a base surface of the information carrier is smaller than an area of the carrier layer, wherein the cover layer is applied in such a way that the cover layer at least portion-wise covers the carrier layer.

In a further embodiment of the invention the information carrier has a first and a second surface, wherein a portion of the information carrier projects with respect to the first surface, wherein the carrier layer or a masking layer of printing ink, that is arranged on the carrier layer, are applied in such a way that it has a recess and the first surface of the information carrier is brought into engagement with the carrier layer or the masking layer in such a way that the portion of the information carrier, that is set back with respect to the first surface, extends into the recess. The operation of applying the masking layer of printing ink again selectively includes applying the masking layer by printing and/or transfer of the masking layer in the form of a printed transfer image.

In an embodiment of the method according to the invention it further has the step: applying a frame of printing ink to the surface of the item of dishware or a carrier layer of printing ink so that the frame leaves out or encloses an area which is at least as large as a base surface of the information carrier or its substrate, wherein the cover layer after the information carrier is put into the frame is printed in such a way that it at least portion-wise covers the surface of the information carrier and the surface of the frame respectively. In that way the edges of a flat information carrier can be concealed by the frame and the printing with the cover layer of printing ink covers over a substantially flat surface. The operation of applying the frame of printing ink again selectively includes applying the frame by printing and/or transfer of the frame in the form of a printed transfer image.

In an embodiment of the method the cover layer completely covers the frame.

In a further embodiment of the invention the frame is applied with a thickness which is substantially equal to the thickness of the information carrier.

It will be appreciated that in such an embodiment the information carrier is desirably attached to the item of dishware only after application and possibly hardening of the frame.

It will be appreciated that, when the frame is applied to a carrier layer, the operation of applying the frame and the carrier layer can also be effected at the same time, in which case then the thickness of the application of ink in the region of the area enclosed by the frame turns out to be less than in the region of the frame itself.

In an embodiment of the invention the operation of applying the carrier layer and/or the frame and/or the cover layer is effected using screen printing, the printing ink being a screen printing ink.

It will be appreciated that in an alternative embodiment in principle the printing method according to the invention could also be carried out using pad printing with a pad printing ink.

In an embodiment of the invention the printing ink of the carrier layer and/or the frame and/or the cover layer is an organic printing ink. Organic printing inks of that kind do not necessarily require hardening by firing of the ink and can therefore be used for the coating operation even if the information carrier which is temperature-sensitive is already attached.

In an embodiment of the invention such an organic printing ink comprises at least two components, one of the components being a hardener. In the case of such multi-component printing inks the drying time can be adjusted and adapted to the operation of printing the combination involved here consisting of the item of dishware and the information carrier.

In an embodiment of the invention the printing ink of the carrier layer and/or the frame and/or the cover layer is a metallic printing ink or a metallic substitute ink.

In an embodiment of the method according to the invention only the cover layer is applied by printing or applied in the form of a transfer image, after attachment of the information carrier. Therefore all other layers of printing inks, in particular the carrier layer and/or the frame, can also be applied in an embodiment using a printing ink which requires firing. In that way the advantages of fired printing inks, in particular their high abrasion resistance and dishwasher resistance, can be used for the carrier layer and/or the frame. In particular ceramic printing inks are suitable for that purpose.

In an embodiment of the method according to the invention the printing ink is hardened by the action of UV radiation on the item of dishware with the information carrier and the printing ink. In a further embodiment the printing ink is hardened by heating the printing ink to a temperature of 70° C. or less, preferably 60° C. or less and particularly preferably 50° C. or less. Such hardening without firing at temperatures above 70° C. makes it possible to seal the information carrier as described to the cover layer of printing ink.

In an embodiment of the method according to the invention the carrier layer and/or the frame and/or the cover layer is applied by printing with a printing head of a printing apparatus, wherein the printing head and the item of dishware are moveable relative to each other, wherein after attachment of the information carrier and prior to printing of the cover layer the printing head is positioned with the steps:

reading out the information carrier with a reading device,
detecting a signal strength of a signal transmitted from the information carrier to the reading device,
determining a position of the information carrier relative to the reading device from the signal strength and
changing the position of the information carrier by movement of the item of dishware with the information carrier relative to the reading device so that the region to be overprinted with the cover layer is under the printing head.

In that way the information carrier already attached to the item of dishware is used as a register means. This embodiment of the method according to the invention is based on the fact that the signal strength of a signal which is emitted by the information carrier and received by the reading device depends on the spacing between the information carrier and the reading device.

Many items of dishware, in particular drinking vessels, involve rotational symmetry. While the spacing of the information carrier from the surface of the item of dishware on which they stand can be well established in the production process so that the spacing of the information carrier after attachment is always the same spacing from a surface of the item of dishware on which it stands, for example the base of a drinking vessel, the positioning in the peripheral direction always has to be exactly determined in order to ensure printing of the information carrier with the cover layer of printing ink.

In particular in an embodiment of the invention in which the item of dishware involves rotational symmetry rotation of the item of dishware relative to the printing head and simultaneous detection of the signal strength of a signal emitted by the information carrier can provide that the absolute position of the signal carrier relative to the printing head can be established and in that case or subsequently the printing head can be moved precisely into a printing position for applying the cover layer.

The present invention therefore also includes a printing apparatus for printing an item of dishware having a printing head and a reading device which is so adapted that in operation of the printing apparatus it contactlessly reads an information carrier arranged on an item of dishware. Such a printing apparatus is suitable for carrying out the above-described embodiment of the method according to the invention for printing on an item of dishware and to provide the required register means by way of the information carrier.

Furthermore it is possible in that way on the one hand to check the attached information carrier for functional operability while still effecting the operation of printing on the item of dishware, but on the other hand to deposit the unique identification of the item of dishware, which is provided by the information carrier, in a database.

In that respect in an embodiment of the invention the reading device is arranged at the printing head. In particular it is desirable for the reading device to be so arranged that, when the signal strength of the signal emitted by the information carrier and received by the reading device is at a maximum, the printing head is arranged at the position at which it can begin with the operation of printing the cover layer.

In an embodiment of the invention the printing apparatus also has a control means so adapted that in operation of the printing apparatus it permits the method according to the invention for printing the cover layer on a surface of the information carrier.

At least one of the above-mentioned objects is also attained by an arrangement comprising an item of dishware comprising a material selected from a group consisting of glass, ceramic and plastic or a combination thereof, and a contactlessly readable electronic information carrier attached to the item of dishware, wherein the arrangement has a cover layer of printing ink and wherein the cover layer at least portion-wise covers a surface of the information carrier and the cover layer extends over a portion, which is not covered by the information carrier, of the surface of the item of dishware.

It will be appreciated that the printing ink of the cover layer, in the portion of the surface of the item of dishware, that is not covered by the information carrier, is either directly in engagement with the surface of the item of dishware or however a further layer of printing ink extends between the surface of the item of dishware and the cover layer.

All features as are produced by the above-described method on the item of dishware having layers of printing ink can be provided in an embodiment as suitable elements at or on the item of dishware of the claimed arrangement.

It is only for the sake of brevity and readability of the description that it dispenses with repeating the individual features of the layer of printing ink once again at this juncture for the arrangement produced with the method. Insofar as aspects of the invention have been described hereinbefore in relation to the method these also apply for the corresponding arrangement with an item of dishware and an information carrier. In particular however embodiments of the method according to the invention are suitable for producing the arrangement according to the invention.

Further advantages, features or possible uses of the present invention will be apparent from the description hereinafter of embodiments and the associated Figures.

In the Figures identical components are denoted by identical references.

DETAILED DESCRIPTION

For the embodiments described hereinafter of the present invention it is assumed that an information carrier 2 is connected to a drinking glass 1. The combination of drinking glass 1 and information carrier 2 forms the arrangement according to the invention. A drinking glass, referred to hereinafter also as a glass for the sake of brevity, forms an example of an item of dishware in accordance with the present application.

Figure 1:
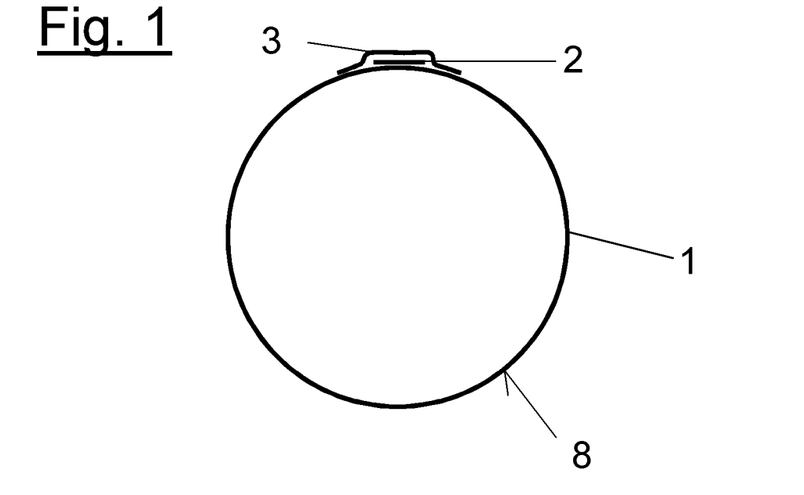
FIG. 1 shows a diagrammatic cross-sectional view of a drinking glass with an information carrier connected thereto in accordance with an embodiment of the present invention.

FIG. 1 shows a diagrammatic cross-sectional view through such a drinking glass 1 with an information carrier 2 which is attached thereto and which is covered by a cover layer 3 of printing ink, protected thereby, and connected to the drinking glass 1. The diagrammatic cross-sectional view in FIG. 1, independently of the specific configuration of the encapsulation of the information carrier, clearly shows the positioning of the information carrier 2 on the drinking glass 1. The positioning is the same for all embodiments shown in FIGS. 2 to 7.

FIGS. 3 to 8 discussed hereinafter show enlarged parts of the diagrammatic view of FIG. 1 in the region of the transponder 2. In the cross-sectional views in FIGS. 3 to 8 the glass or its surface is shown as a flat shape. That appears justified by virtue of the greatly enlarged view of the part shown. In actual fact however the glass surface 8 of all embodiments is curved as shown in FIG. 1.

Figure 2:
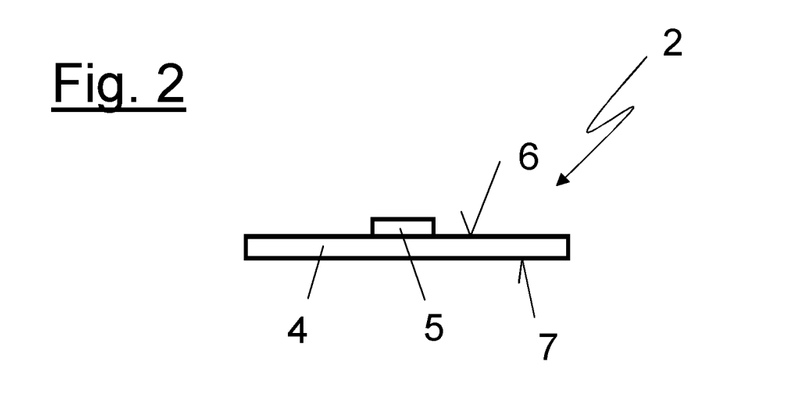
FIG. 2 shows a diagrammatic cross-sectional view of an information carrier according to an embodiment of the present invention.

The information carrier being considered here is an RFID transponder as is diagrammatically shown in the cross-sectional view of FIG. 2. The transponder 2 includes a planar antenna structure (not shown in the Figures) applied by printing to a flat substrate 4 and a processing circuit integrated in a chip 5. By virtue of the structural configuration involved the chip 5 projects in relation to the first surface 6 of the otherwise flat structure of the substrate. The second surface 7 of the transponder 2 in contrast is completely flat and does not have any projections.

The view in FIG. 2 already shows one of the challenges overcome according to the invention, namely concealing the unevenness or the edges formed by the chip 5 projecting in relation to the first surface 6, and protecting the chip from being torn off.

Figure 3:
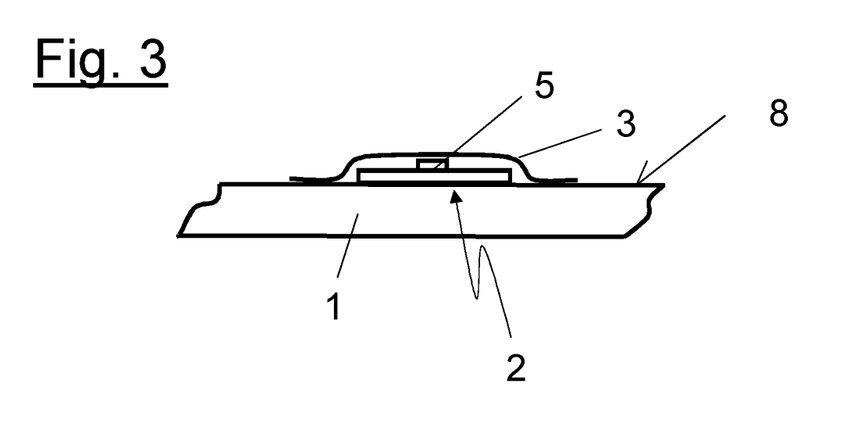
FIG. 3 shows a broken-away diagrammatic cross-sectional view of a drinking glass with an information carrier according to a first embodiment of the present invention.

In the first comparatively simple embodiment of the arrangement according to the invention shown in FIG. 3 the chip is attached directly on the surface 8 of the glass 1. In the illustrated embodiment the transponder 2 is provided with a self-adhesive film so that its second surface 7 is firstly glued to the glass surface 8.

After the transponder 2 has been glued in place the glass 1 is printed upon in the region of the transponder 2 with a cover layer 3 of a glass ink. That is found to be difficult for a number of reasons. On the one hand, two different materials have to be printed upon with the same glass ink of the cover layer, more specifically on the one hand the glass material of the drinking glass 1 and on the other hand the plastic material of the transponder 2. In addition the glass ink 3 cannot be fired in a subsequent working step as otherwise the transponder 2 would be damaged. Therefore the glass ink was carefully selected for the cover layer 3 of the embodiment of FIG. 3 but also for the cover layers 3 of all further embodiments as shown in the other Figures.

In addition in the embodiments in FIGS. 3 to 6 the glass ink must cover over the comparatively thick structure of the transponder 2 and level out the surface structure on the second surface 6 which is produced by the projecting chip 5. Otherwise there would not be an aesthetically attractive print image in respect of the cover layer 3.

Therefore an organic two-component glass ink comprising an ink component and a hardener was selected as the cover layer 3. That has the advantage that it is hardened comparatively quickly by heating the structure comprising the glass 1, the transponder 2 and the cover layer 3, but it manages without a firing operation. In the illustrated embodiment the glass ink of the cover layer 3 is so selected that, with suitable heating to a temperature of 65° C., it hardens dust-dry within 30 seconds.

That turns out to be a challenge in particular because the cover layer 3 must cover over the entire transponder with a thickness of 200 μm. In other words the ink layer is of a thickness of up to 250 μm.

In addition it is appropriate to so select the printing ink that the ink is of high viscosity in order to prevent the ink from running off the structure of the transponder 2 after the printing operation and prior to drying.

The embodiment of the arrangement according to the invention as shown in FIG. 3 is suitable in particular for colored glasses. If in contrast in the case of transparent glasses there is a wish to prevent a viewer being able to look through the transparent material of the glass 1 on to the transponder 2 then the transponder has to be applied to a non-transparent carrier layer.

Figure 4:
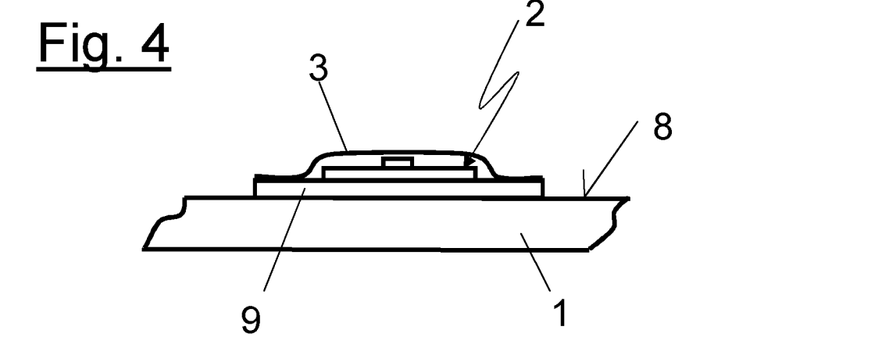
FIG. 4 shows a broken-away diagrammatic cross-sectional view of a drinking glass with an information carrier according to a second embodiment of the present invention.
Figure 5:
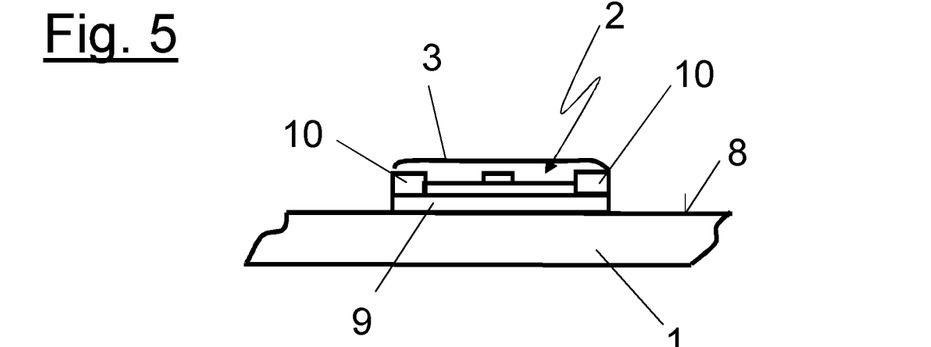
FIG. 5 shows a broken-away diagrammatic cross-sectional view of a drinking glass with an information carrier according to a third embodiment of the present invention, FIGS. 6a) to 6e) show diagrammatic views of the steps of a method for fixing an information carrier to an item of dishware according to an embodiment of the present invention.
Figure 6:
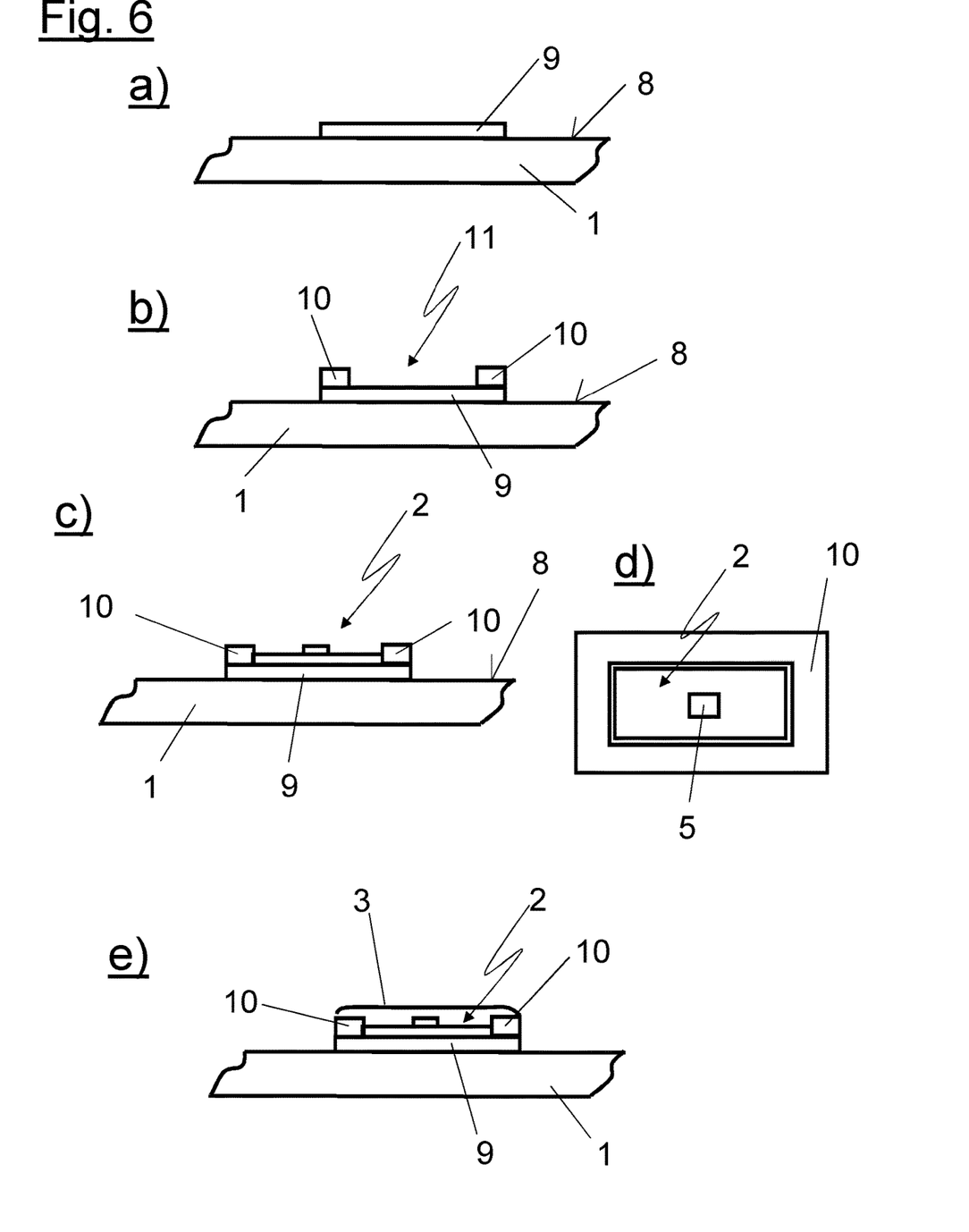

Embodiments of the arrangement according to the invention with such a carrier layer are shown in FIGS. 4 to 6. The carrier layer is applied by printing to the surface 8 of the glass 1 in a first step. The area in FIGS. 4 to 8 of the carrier layer identified by reference 9 is so selected that it is greater on all sides than the base surface of the transponder 2. With such a choice of the area of the carrier layer 9 the cover layer 3 can be applied by printing in such a way that it is in engagement only with the carrier layer 9, but not with the surface 8 of the glass. That facilitates the choice of the printing ink for the cover layer 3.

As the carrier layer 9 is printed on to the glass 1 prior to attachment of the transponder 2 to the structure there is the possibility of selecting the printing ink for the carrier layer 9 without the limitations which are to be taken into account when selecting the printing ink for the cover layer 3. In particular, as in the illustrated embodiments, it is possible to select for the carrier layer 9 a ceramic ink which has to be fired after the printing operation for complete hardening.

FIG. 5 shows an embodiment in which a structural space of printing ink is provided for receiving the transponder 2, by printing on the glass 1. In order to clearly show the construction of the structure shown in FIG. 5 FIG. 6 explains the individual method steps when producing the structure, as are performed in succession. All printing steps, as are diagrammatically shown in succession in FIGS. 6a-6e, are carried out using a screen printing method.

Firstly a carrier layer 9 of a ceramic printing ink is applied by printing to the surface 8 of the glass 1. In a second printing step a frame 10, also comprising a ceramic printing ink, is printed on to the carrier layer 9. That ceramic ink has the advantage that it has a high level of resistance to mechanical damage but also a high level of dishwasher resistance. As the operation of printing the carrier layer 9 and the frame 10 is effected before attachment of the transponder 2 the ceramic ink can be fired prior to attachment of the transponder 2 at temperatures over 70° C. in order to completely harden it and to obtain its excellent chemical and mechanical properties.

After firing of the carrier layer 9 and the frame 10 the transponder 2 is introduced into the structural space 11 defined by the frame 10. FIG. 6c) shows a cross-sectional view through the structure with the transponder 2 while FIG. 6d) shows a plan view from above on to the structure. The area enclosed by the frame 10 is just so selected that the base surface of the substrate 4 of the transponder 2 can be completely received in that frame 10.

The height of the frame 10 is so selected that it is a little higher than the thickness of the substrate 4 of the transponder 2. In a concluding method step the cover layer 3 is applied by printing to the transponder 2 and the frame 10. That arrangement of the various ink layers produces a continuous surface 12 which substantially follows the configuration of the surface 8 of the glass 1. The structure created in that way satisfies high aesthetic demands while at the same time it ideally connects the transponder 2 to the glass 1 and protects the transponder 2.

Figure 7:
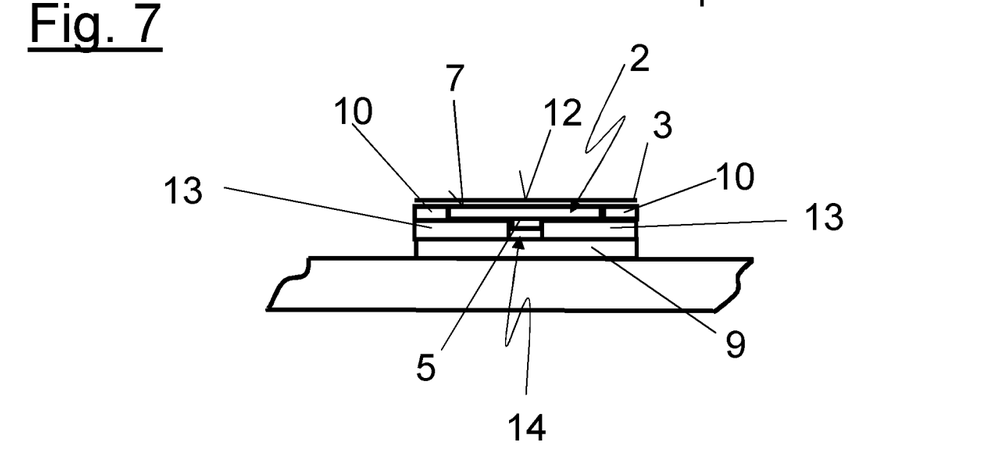
FIG. 7 shows a broken-away diagrammatic cross-sectional view of a drinking glass with an information carrier according to a fourth embodiment of the present invention.

The embodiment in FIG. 7 differs from the embodiment of FIGS. 5 and 6 in that a masking layer 13 is provided between the carrier layer 9 and the frame 10. That serves to receive the chip 5 of the transponder 2 in a recess 14. Compared to the embodiments of FIGS. 3-5, the chip in this variant is turned round so that, instead of its first surface 6, a second surface 7 is in engagement with the cover layer 3. The evenness of the surface 12 of the cover layer 3 can also be further enhanced in that way.

Figure 8:
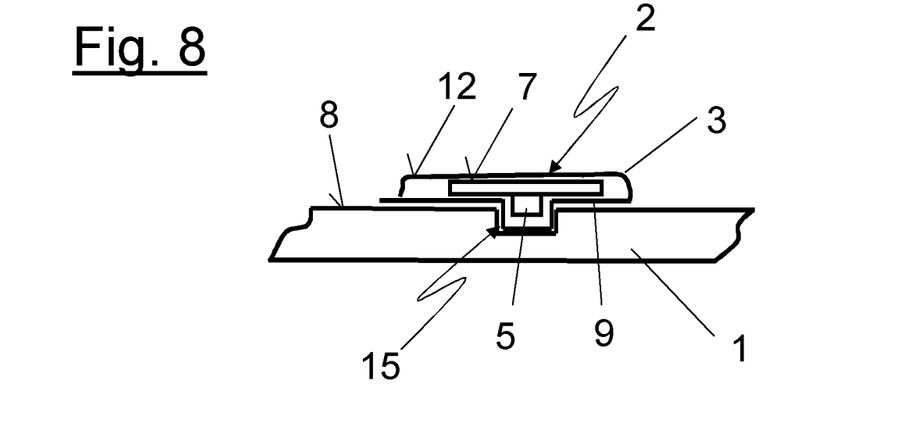
FIG. 8 shows a broken-away diagrammatic cross-sectional view of a drinking glass with an information carrier according to a fifth embodiment of the present invention.

In the alternative embodiment of FIG. 8 the glass 1 itself has a depression 15 serving to receive the chip 5 of the transponder 2. As previously in FIG. 7 the transponder is attached in such a way that the cover layer 3 is in engagement with the second surface 7 of the transponder. This embodiment dispenses with the frame of the embodiments shown in FIGS. 5-7.

Figure 9:
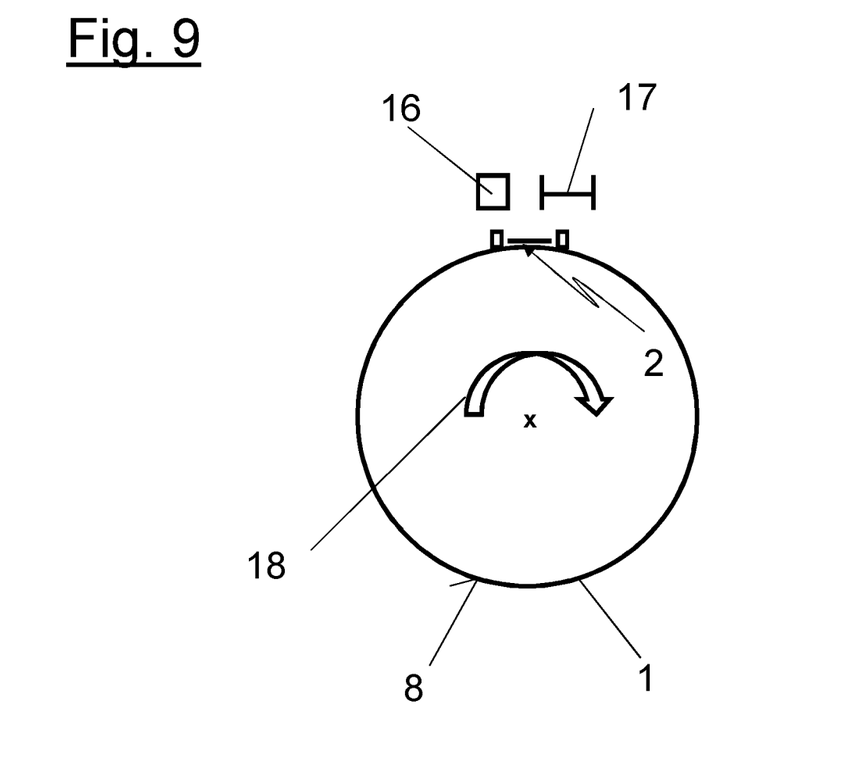
FIG. 9 shows a diagrammatic cross-sectional view through a printing apparatus according to an embodiment of the present invention.

FIG. 9 diagrammatically shows the glass 1 in a printing apparatus. The printing apparatus includes a screen printing head 17 and an RFID reading device 16. After the carrier layer 9 is printed on to the glass 1 and possibly further layers and after attachment of the transponder 2, the transponder 2 provides a register means. That makes it possible for the cover layer 3 to be precisely applied by printing over the transponder 2.

If a large number of glasses is printed with the screen printing apparatus in succession then the position of the printing head 15 can be set to be constant in the axial direction of the glass 1. The machine then has an abutment surface for the base surface or the bottom of the glass 1. In that way the axial position or height of the transponder 2 and thus the printing position is fixed in the axial direction. It will be noted that it is important for the printing head 15 to be positioned in the peripheral direction in such a way that the transponder 2 is overprinted with the printing process. For that purpose according to the invention a signal is read from the transponder 2 by means of the reading device 16. When the signal strength is at a maximum the transponder 2 is directly under the reading device 16 and is at a minimum spacing relative to the reading device. If, as diagrammatically shown in FIG. 9 the printing head 15 and the reading device 16 are arranged in immediately mutually adjoining relationship then it is now possible to begin with the printing operation as it is guaranteed that the printing head 15 is directly over the transponder or immediately beside same. For establishing and maximizing the signal received by the reading device 16 the glass 1 is rotated about its axis, as indicated by the arrow 18.

At the same time a functional test of the transponder 2 can be carried out immediately prior to and/or after the printing operation involving the cover layer by virtue of the arrangement of the reading device 16 beside the printing head 15. In addition at that time the identification that the transponder 2 provides can be uniquely associated with the glass in a database. In particular the data of manufacture and the batch can be associated with the unique identification.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

LIST OF REFERENCES 1 drinking glass
2 RFID transponder
3 cover layer
4 substrate
5 chip
6 first surface
7 second surface
8 glass surface
9 carrier layer
10 frame
11 structural space
12 area
13 masking layer
14 recess
15 depression 16 RFID reading device
17 screen printing head
18 arrow

What is claimed is:

1. A method of connecting an item of dishware to a contactlessly readable electronic information carrier comprising the steps:
providing the item of dishware, wherein the item of dishware is composed of a material selected from a group comprising one or more of glass, ceramic, and plastic;
placing the information carrier on the item of dishware; and
applying a cover layer of printing ink in such a way that the cover layer at least portion-wise fully covers a surface of the information carrier and the cover layer extends over a portion, which is not covered by the information carrier, of a surface of the item of dishware such that adhesion of the information carrier to the item of dishware is provided by the cover layer of printing ink.

2. A method according to claim 1, wherein the application of the cover layer includes applying the cover layer by one of printing and transferring the cover layer in the form of a printed transfer image.

3. A method according to claim 1, wherein the printing ink of the cover layer is printed on to the surface of the information carrier with a thickness of at least 100 µm.

4. A method according to claim 1, wherein the information carrier has a first and a second surface, wherein a portion of the information carrier projects with respect to the first surface, wherein the information carrier is attached to the item of dishware in such a way that the cover layer is in engagement with the first surface and the portion of the information carrier that projects with respect to the first surface.

5. A method according to claim 1, wherein an item of dishware has a receiving portion at least for a portion of the information carrier in the form of one of a depression and a groove in the surface of the item of dishware.

6. A method according to claim 1, further comprising the step:
applying a carrier layer of printing ink to a surface of the item of dishware, wherein the information carrier is applied to the carrier layer.

7. A method according to claim 6, wherein the printing ink of one or both of the carrier layer and the cover layer is an organic printing ink.

8. A method according to claim 1, wherein a base surface of the information carrier is smaller than an area of a carrier layer, wherein the cover layer is applied in such a way that the cover layer at least portion-wise covers the carrier layer.

9. A method according to claim 1, further comprising the step:
applying a frame of printing ink to a surface of the item of dishware and to a carrier layer of printing ink so that the frame leaves out an area that is at least as large as a base surface of the information carrier, wherein the cover layer is applied in such a way that it at least portion-wise respectively covers the surface of the information carrier and the surface of the frame.

10. A method according to claim 9, wherein the cover layer completely covers the frame.

11. A method according to claim 9, wherein the printing ink of one or both of the carrier layer and the frame is a ceramic printing ink, wherein after application of one or both of the carrier layer and the frame and prior to attachment of the information carrier, the ceramic printing ink is fired.

12. A method according to claim 1, wherein application of one or both of a carrier layer and the cover layer is effected using screen printing, wherein the printing ink is a screen printing ink.

13. A method according to claim 1, wherein the printing ink is hardened by the action of one or both of UV radiation and heating the printing ink to a temperature of no more than 70° C.

14. A method of connecting an item of dishware to a contactlessly readable electronic information carrier comprising the steps:
providing the item of dishware, wherein the item of dishware is composed of a material selected from a group comprising one or more of glass, ceramic, and plastic;
attaching the information carrier to the item of dishware; and
applying a cover layer of printing ink in such a way that the cover layer at least portion-wise covers a surface of the information carrier and the cover layer extends over a portion, which is not covered by the information carrier, of a surface of the item of dishware, wherein the cover layer is applied by printing with a printing head of a printing apparatus, wherein the printing head and the item of dishware are moveable relative to each other, and wherein after attachment of the information carrier and prior to printing of the cover layer, a position of the printing head is set relative to the information carrier with the steps:
reading out the information carrier with a reading device;
detecting a signal strength of a signal transmitted from the information carrier to the reading device;
determining a position of the information carrier relative to the reading device from the signal strength; and
changing the position of the information carrier by movement of the item of dishware with the information carrier relative to the reading device so that the region to be overprinted with the cover layer is under the printing head.

15. An arrangement comprising:
an item of dishware composed of a material selected from a group comprising one or more of glass, ceramic and plastic; and
a contactlessly readable electronic information carrier attached to the item of dishware, wherein the arrangement has a cover layer of printing ink, and wherein the cover layer at least portion-wise fully covers a surface of the information carrier and the cover layer extends over a portion, which is not covered by the information carrier, of the surface of the item of dishware such that adhesion of the information carrier to the item of dishware is provided by the cover layer of printing ink.

* * * * *